United States Patent [19]
Shingai et al.

[11] Patent Number: 5,482,791
[45] Date of Patent: Jan. 9, 1996

[54] FUEL CELL/GAS TURBINE COMBINED POWER GENERATION SYSTEM AND METHOD FOR OPERATING THE SAME

[75] Inventors: Hiroshi Shingai; Hideo Nishigaki, both of Kawasaki, Japan

[73] Assignee: Fuji Electric Co., Ltd., Kawasaki, Japan

[21] Appl. No.: 186,512

[22] Filed: Jan. 26, 1994

[30] Foreign Application Priority Data

Jan. 28, 1993 [JP] Japan ................................ 5-012058
May 7, 1993 [JP] Japan ................................ 5-105767

[51] Int. Cl.⁶ .................................................. H01M 16/00
[52] U.S. Cl. ................................................ 429/23; 429/22
[58] Field of Search ........................................ 429/22, 23

[56] References Cited

U.S. PATENT DOCUMENTS 5,006,425  4/1991  Tokobayashi ........................ 429/23
5,334,463  8/1994  Tojima et al. ........................ 429/9

FOREIGN PATENT DOCUMENTS

58-7772  1/1983  Japan.
2168569  6/1990  Japan.

*Primary Examiner*—Prince Willis, Jr
*Assistant Examiner*—M. Nuzzolillo
*Attorney, Agent, or Firm*—Spencer & Frank

[57] ABSTRACT

A combined fuel cell/gas turbine power generation system includes a fuel cell, a reformer connected to the fuel cell for producing a hydrogen rich reformed gas by steam reforming and feeding the reformed gas to the fuel cell, an air compressor having an electric motor which drives the air compressor, the air compressor compressing air taken from open air and feeding a pressurized air to the fuel cell, a gas turbine which is connected to the fuel cell and generates power using, as a working fluid, an exhaust combustion gas from the reformer obtained by burning an off gas and off air from the fuel cell, and a generator which is coaxially connected to the gas turbine and driven by the axial output power of the gas turbine, the generator generating power with the axial output power of the generator, the output power of the generator driving the electric motor in the air compressor.

33 Claims, 8 Drawing Sheets

FUEL CELL/GAS TURBINE COMBINED POWER GENERATION SYSTEM AND METHOD FOR OPERATING THE SAME

BACKGROUND OF THE INVENTION

1. Field of the Invention

The present invention relates to a fuel cell/gas turbine combined power generation system, and more particularly to such a combined power generation system having a high pressure phosphoric acid fuel cell and a gas turbine in combination. The present invention also relates to a method of operating such a fuel cell/gas turbine combined power generation system.

2. Description of the Prior Art

Generally, phosphoric acid fuel cells give higher power generation efficiencies at higher operation pressures. Hence, in fuel cell power generation plants with relatively large capacities, for example, 1,000 kW or higher, there have been widely adopted high pressure phosphoric acid fuel cells which operate with reactant gases pressurized to, e.g., about 4 to 8 $Kg/cm^2G$. Fuel cell power plants of this type include a high pressure reformer which reforms a feed gas such as natural gas by means of steam reforming to produce a hydrogen rich reformed fuel gas, which is sent to respective anodes of the fuel cells while air taken in from the open air is compressed by an air compressor to produce pressurized air, which is sent under pressure as an oxidizer gas to respective cathodes of the fuel cells so that power generation can be carried out.

There have been known various types of power generation systems. For example, a fuel cell power generation system is known which includes a gas turbine for driving an associated air compressor. The gas turbine, which is coaxially connected to the air compressor and drives it, recovers power or energy by use of, as a working fluid, exhaust combustion gas from a reformer and exhaust air from the fuel cell. The fuel in the reformer gets the heat necessary for a reforming reaction from combustion of the anode off gas and the cathode off air from the fuel cell during its operation, as described in, for example, Japanese Patent Application Publication No. 56231/1983. Japanese Patent Application Laying-open No. 168569/1990 discloses a fuel cell power generation system which includes an air compressor, a gas turbine and a generator or dynamo driven by the gas turbine to generate electric power, and uses the thus generated electric energy to energize an electric motor to drive the air compressor. Also, a fuel cell power generation system is known which includes an auxiliary burner provided in the middle of an exhaust combustion gas feed line from the reformer so that a shortage in power of the gas turbine can be supplemented by burning a fuel with air at the time of starting the operation of the fuel cell or while the fuel cell is being operated at a low load (cf., e.g., Japanese Utility Model Registration Application Laying-open No. 128175/1984, and Japanese Patent Application Publication No. 56231/1983).

Further, there is known, as a combined cycle for recovering waste heat from a fuel cell power generation plant, a fuel cell power generation system having the above-described gas turbine in which the gas turbine drives a generator to generate power while the exhaust gas from the gas turbine is used to drive a turbo compressor to get pressurized air to be fed to the fuel cell (Japanese Patent Application Laying-open No. 7772/1983). In addition, a fuel cell power generation system is known which includes a generator and an air compressor that are coaxially connected to and driven by a gas turbine, and which is provided with a separate waste heat recovery boiler that uses waste heat from the gas turbine as a heat source so that it can produce steam, thereby allowing the system to generate power by the use of a steam turbine as well as the generator (Japanese Utility Model Registration Application Laying-open No. 128175/1984).

In the aforementioned combined system which includes a power generation plant designed for a phosphoric acid fuel cell and in combination therewith a gas turbine which recovers waste heat (i. e., exhaust combustion gas from the reformer) in the form of power, the gas turbine operates at an inlet gas temperature of a maximum of about 300° C. to about 400° C., and generates relatively low power. Actually, almost all the output power of the gas turbine is consumed for driving the air compressor which feeds pressurized air to the air system of the fuel cell. As a result, even when the generator is driven with a surplus output by the gas turbine or the separately arranged steam turbine/generator combined system is driven using waste heat from the gas turbine as a heat source, the amount of generated power will be very small in terms of the total heat account within the whole system. Accordingly, use of the waste heat insufficient for power generation is obtained by the additional installment provided in the system to enable the system as a combined cycle.

SUMMARY OF THE INVENTION

Under the circumstances, the present invention has been made with a view to obviating the aforementioned disadvantages of the prior art. Therefore, it is an object of the present invention to provide a combined power generation system having a high thermal or heat value efficiency and including an auxiliary device or devices in addition to a high pressure fuel cell and a gas turbine in combination so that the supply of an additional fuel can increase the output power of the gas turbine to a greater extent and so that the increment in power can be recovered as electric power.

Another object of the present invention is to provide a method of operating a combined fuel cell/gas turbine power generation system of the aforementioned type, which method enables alleviating conditions under which a reformer is used and heat energy given by feed gas charged in the power generation system is recovered as electric power at a high thermal efficiency.

According to an aspect of the present invention, there is provided a fuel cell/gas turbine combined power generation system comprising: a high pressure fuel cell which generates power with reformed fuel gas and pressurized air from an air compressor as reactant gases; a gas turbine which obtains power from a working fluid consisting of exhaust combustion gas from the reformer and combustion gas obtained by burning additional fuel added to an auxiliary burner and an off gas from the fuel cell; and a generator which is driven by an axial output power of the gas turbine.

Here, the combined power generation system may further comprise a bypass line which bypasses the fuel cell and feeds the pressurized air from the air compressor to the auxiliary burner.

The combined power generation system may further comprise an exhaust gas boiler which generates steam utilizing the exhaust gas from the gas turbine as a heat source.

The steam generated in the exhaust gas boiler may be introduced into the fuel cell to preheat a body of the fuel cell when operation of the fuel cell is started.

The steam generated in the exhaust gas boiler may be fed to the gas turbine to recover heat during operation of the fuel cell.

The steam generated in the exhaust gas boiler may be fed to a steam turbine which is coaxially connected to the gas turbine to drive the generator.

According to another aspect of the present invention, there is provided a combined fuel cell/gas turbine power generation system comprising: a reformer which reforms feed gas to generate a reformed fuel gas; an air compressor which produces pressurized air; a high pressure fuel cell having an anode which is connected to the reformer and receives reformed gas from the reformer, and a cathode which is connected to the air compressor and receives pressurized air from the air compressor, the fuel cell using the reformed fuel gas and the pressurized air as reactant gases; an auxiliary burner which is connected to the cathode of the fuel cell and burns an additional fuel and an off gas from the cathode of the fuel cell to produce a combustion gas; a gas turbine which is connected to the auxiliary burner and generates power using the combustion gas from the auxiliary burner as a working fluid; and a generator which is coaxially connected to the gas turbine and driven by the axial output power of the gas turbine.

Here, the combined power generation system may further comprise: a bypass line which is connected to the air compressor and to the auxiliary burner, and which bypasses the fuel cell to directly feed pressurized air from the air compressor to the auxiliary burner.

The combined power generation system may further comprise: an exhaust gas boiler which is connected to the gas turbine and produces steam using the exhaust gas from the gas turbine as a heat source.

The power generation system may further comprise a first steam line which connects the exhaust gas boiler to the fuel cell and feeds the steam produced in the exhaust gas boiler to the fuel cell to preheat a body of the fuel cell when operation of the fuel cell is started.

The power generation system may further comprise a second steam line which connects the exhaust gas boiler to the gas turbine and feeds the steam produced in the exhaust gas boiler to the gas turbine for heat recovery.

The power generation system may further comprise a steam turbine which is coaxially connected to the gas turbine, and a third steam line which connects the exhaust gas boiler to the steam turbine and feeds the steam produced in the exhaust gas boiler to the steam turbine to drive the generator.

The combined power generation system may further comprise: an electric motor which is connected to the air compressor and drives the air compressor, and an electric power line which feeds power generated by the generator to the electric motor.

The body of the fuel cell may be provided with a cooling means having a feed line for circulating cooling water.

The combined power generation system may further comprise: a mixer which is inserted in the feed line of the cooling means, wherein the first steam line is connected to the feed line of the cooling means through the mixer.

According to still another aspect of the present invention, there is provided a method of operating a combined fuel cell/gas turbine power generation system including a fuel cell which generates power using as reactant gases a hydrogen rich reformed gas obtained by steam reforming of a feed gas in a reformer, and pressurized air obtained by compressing air taken from open air by a compressor, a gas turbine which recovers power utilizing as a working fluid an exhaust combustion gas from the reformer obtained by burning an off gas and an off air from the fuel cell, and a generator which is coaxially connected to the gas turbine and driven by the axial output power of the gas turbine, wherein the method comprises the steps of: providing an auxiliary burner which is connected to the fuel cell and the gas turbine; feeding a portion of the off gas and a portion of the off air to the auxiliary burner; feeding to the auxiliary burner an additional fuel in an amount in balance against an amount of the portion of the off gas from the fuel cell so that oxygen in the portion of the off gas can be consumed substantially completely; burning the additional fuel and the portion of the off gas, and the portion of the off air in the auxiliary burner to produce a combustion gas; and feeding the combustion gas together with the exhaust combustion gas from the reformer to the gas turbine.

According to yet another aspect of the present invention, there is provided a method of operating a combined fuel cell/gas turbine power generation system including a fuel cell which generates power using as reactant gases a hydrogen rich reformed gas obtained by steam reforming of a feed gas in a reformer, and pressurized air obtained by compressing air taken from open air by a compressor, a gas turbine which recovers power utilizing as a working fluid an exhaust combustion gas from the reformer obtained by burning an off gas and an off air from the fuel cell, and a generator which is coaxially connected to the gas turbine and driven by the axial output power of the gas turbine, the generator generating power with the axial output power of the generator, the output power of the generator driving the electric motor in the air compressor, the fuel cell, the gas turbine and the generator being in operational combination, wherein the method comprises the steps of: increasing the amount of feed gas to be fed to the reformer, without substantially changing the amount of hydrogen produced, to maintain a conversion into hydrogen and an equilibrium temperature of reaction at low levels, respectively; converting heat generated with an unreformed portion of the feed fuel into power by the gas turbine, the unreformed portion of the feed fuel being in an amount which corresponds to the additional amount of the feed gas; and recovering the power as electric power from the generator.

The method may further comprise the steps of: feeding a portion of the off gas and a portion of the off air to an auxiliary burner connected to the fuel cell and the gas turbine; burning the portion of the off gas and the portion of the off air in the auxiliary burner to produce a combustion gas; and feeding the combustion gas together with the exhaust combustion gas from the reformer to the gas turbine.

Assuming that the oxygen utilization ratio of the fuel cell in the combined power generation system having the aforementioned construction is about 50% for the pressurized air (oxygen content: 50%) fed to the fuel cell from the air compressor, then the exhaust air from the fuel cell contains at least 9.5% of oxygen. This concentration of oxygen is high enough to burn the fuel. Accordingly, the exhaust air from the fuel cell is divided into two portions, and one of them is fed to a burner in the reformer while the other is fed to an auxiliary burner additionally arranged on the side of the inlet of the gas turbine. An additional fuel is fed to the auxiliary burner in an amount properly in balance against the amount of the exhaust air from the fuel cell so that the exhaust air can be fully utilized. As a result, the inlet temperature of the gas turbine elevates to about 500° C. to about 900° C. in contrast to about 300° C. to about 400° C.

which temperature is reached by the prior art systems that use the exhaust combustion gas from the reformer as a working fluid. This temperature elevation results in an increase in the power generated by the generator which is driven by the gas turbine. Thus, the whole system, in cooperation with the fuel cell and the gas turbine, generates a large amount of power.

In addition, the air necessary for the combustion of the fuel additionally fed to the auxiliary burner is all provided by the exhaust air from the fuel cell, resulting in that there occurs no power consumption for air compression. Hence, the thermal efficiency for additional fuel increases greatly, which leads to a considerable increase in thermal efficiency at a sending end. The gas turbine used in the combined power generation system must be designed so as to be compatible with or resistant to the aforementioned inlet temperature (500° C. to 900° C.).

Since the outlet temperature of the turbine increases by an increment of the inlet temperature of the gas turbine, a large amount of high temperature steam can be produced by introducing the exhaust gas from the gas turbine to an exhaust gas boiler. Then, if the exhaust gas boiler is so constructed that it can be operated before the operation of the fuel cell is started, the body of the fuel cell can be preheated to a temperature near the operation temperature of the fuel cell already at the time of starting its operation by utilizing the steam produced by the exhaust gas boiler. Besides, during the operation of the fuel cell, the steam produced by the exhaust gas boiler may be fed back to the inlet side of the gas turbine to recover power (chain cycle) or to the steam turbine to recover power (combined cycle of the gas turbine and the steam turbine). This increases the output power and further increases the thermal efficiency of the additional fuel.

In the case where the system provided with a bypass line which connects the air compressor to the auxiliary burner in order to feed pressurized air to the auxiliary burner and the bypass line is opened upon stoppage of the operation of the fuel cell which occurs as in the case of a malfunction, for example, the pressurized air compressed by the air compressor can be fed directly to the auxiliary burner to drive the gas turbine alone so that power generation can be continued.

As in the aforementioned method of operation, when the feed gas is supercharged to the reformer by increasing the amount of the feed gas without changing the ratio of hydrogen component in the reformed gas generated by steam reforming of the feed gas by the reformer, the conditions of the operation of the reformer can be changed. More particularly, conversion into hydrogen of the fuel can be lowered in accordance with the increment of the feed gas, and in relation thereto, the equilibrium temperature of the reforming reaction can be lowered. Therefore, there can be lowered the maximum temperature at which the reformer can be used and which is allowed based on the design of the reformer to such an extent as corresponds to the decrease in the equilibrium temperature of the reaction. This gives great advantages in the selection of materials during designing of reformer and in its manufacture.

On the other hand, the gas which leaves the reformer contains large amounts of unreformed components because of the addition of the feed gas. The unreformed components are fed to the burner of the reformer and to the auxiliary burner arranged separately, and the components are burned therein so that the working gas fed to the gas turbine can be heated to increase the output power of the gas turbine. In other words, an additional amount of feed gas can be converted into power at high efficiencies, and the power can be recovered as electric power from the generator driven by the gas turbine.

Further, assuming the rate of oxygen, utilized in the fuel cell, of the pressurized air fed to the fuel cell from the compressor is about 50%, then the cathode off gas from the fuel cell contains at least 9.5% of oxygen. If the total amount of the cathode off gas is consumed as combustion air, a relatively large amount of the feed gas can be fed to the reformer as an additional fuel and the additional portion of the feed gas can be burned as an off gas from the fuel cell. Actually, the off gas from the fuel cell is fed to the burner of the reformer and to the auxiliary burner additionally arranged anew on the inlet side of the gas turbine and burned by use of the above-described off air, resulting in that the inlet gas temperature of the gas turbine elevates to 500° to 900° C. Moreover, in the present invention, there is no need for consuming additional energy for compressing air since all the air necessary for the combustion of the off gas whose amount corresponds to the amount of the added feed gas can be provided by the off gas from the fuel cell as described above. This greatly improves the thermal efficiency of the additional portion of the feed gas, with the result that the thermal efficiency at the sending end of the fuel cell/gas turbine combined power generation system as a whole increases to a great extent.

The above and other objects, effects, features and advantages of the present invention will become more apparent from the following description of embodiments thereof taken in conjunction with the accompanying drawings.

DESCRIPTION OF PREFERRED EMBODIMENTS

Hereinafter, the present invention will be described in more detail by way of examples referring to the accompanying drawings. However, the present invention should not be construed as being limited thereto.

Embodiment 1

Figure 1:
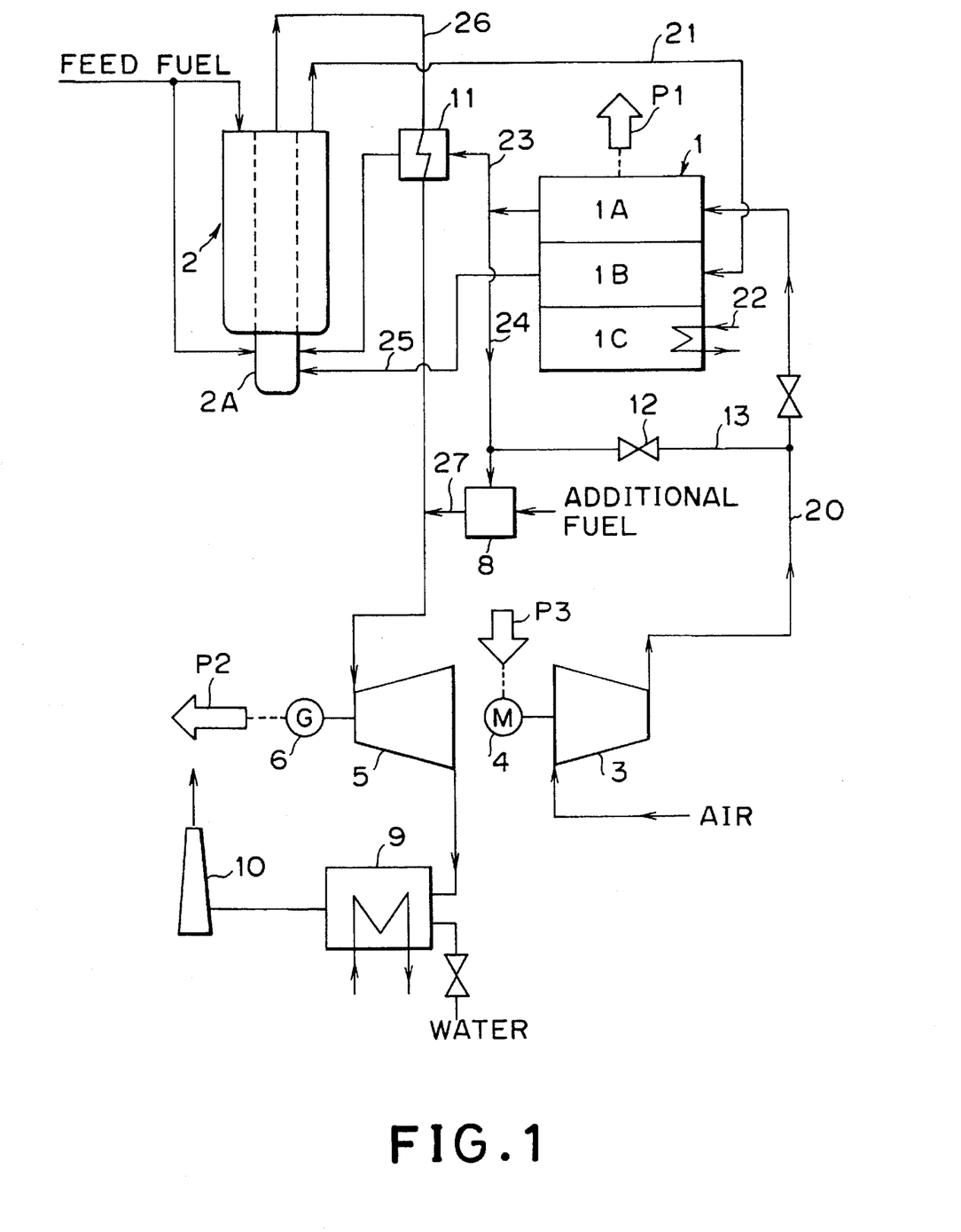
FIG. 1 is a schematic diagram showing the construction of a combined fuel cell/gas turbine power generation system according to a first embodiment of the present invention.

FIG. 1 is a schematic diagram showing the construction of a combined fuel cell/gas turbine power generation system according to a first embodiment of the present invention. In FIG. 1, reference numeral 1 denotes a pressure phosphoric acid fuel cell, 1A is a cathode of the fuel cell 1, 1B is an anode of the fuel cell 1, 1C is a cooling plate of the fuel cell 1, 2 is a reformer, 2A is a burner of the reformer 2, 3 is an air compressor which feeds pressurized air to the cathode 1A of the fuel cell 1, 4 is an electric motor for driving the air compressor 3, 5 is a gas turbine connected to an exhaust combustion gas line of the reformer 2, 6 is a generator coaxially connected to the gas turbine 5, 8 is an auxiliary burner arranged additionally according to the present invention, 9 is a heat exchanger for collecting water, connected to an outlet side of the gas turbine 5, 10 is a chimney for releasing exhaust gas, 11 is a heat exchanger inserted in an exhaust combustion gas line from the reformer 2, 12 is a valve, 13 is a pressurized air bypass line. 20, 21, 22, 23, 24, 25, 26 and 27 are feed lines.

In the aforementioned construction, the air compressor 3 is driven by the electric motor 4 so that air taken from the open air and pressurized by the air compressor 3 is fed to the cathode 1A of the fuel cell 1 through the feed line 20. Feed gas (natural gas) is reformed into a hydrogen-rich reformed fuel gas in the reformer 2 before it can be fed to the anode 1B of the fuel cell through the feed line 21. The fuel cell 1 receives these reactant gases (reformed fuel gas and pressurized air) and generates electricity therewith. During the operation of the fuel cell 1, cooling water is circulated through the feed line 22 extended into the cooling plate 1C to cool the body of the fuel cell 1. The off air leaving the cathode 1A during the operation of the fuel cell 1 is separately fed on one hand to the burner 2A of the reformer 2 and on the other hand to the auxiliary burner 8 through the feed lines 23 and 24, respectively. In the burner A, the off air from the cathode 1A together with the off gas from the anode 1B fed through the feed line 25 are burned to give heat in an amount necessary for the reforming of the fuel. The combustion gas leaving the auxiliary burner 8, combined with the exhaust combustion gas from the reformer 2, is introduced into the gas turbine 5.

On the other hand, the gas turbine 5 generates electric power using a mixture of the exhaust combustion gas fed from the reformer 2 through the feed line 26 via the heat exchanger 11 and the combustion gas obtained from the auxiliary burner 8 and fed through the feed line 27 as a working fluid, and drives the generator 6 by its axial output or power. Here, an additional fuel such as city gas or the like is charged into the auxiliary burner 8 in an amount in balance against the amount of off air fed from the fuel cell 1, and the reactant gases are burned therein. The electric power P2 generated by the generator 6, together with the electric power P1 generated by the fuel cell 1, is sent to an electric power system (not shown). A portion (P3) of the electric power (P1+P2) is consumed by the electric motor 4 when it drives the air compressor 3.

Further, in the embodiment shown in FIG. 1, the pressurized air bypass line 13 having the valve 12 for opening and closing the line is provided between the outlet side of the air compressor 3, or the feed line 20, and the feed line 24 for feeding the off air connected to the auxiliary burner 8. Ordinarily, the valve 12 is closed. In case the fuel cell 1 fails or malfunctions or an emergency or other unusual situation occurs during operation of the power generation system, the valve 12 is opened so that the bypass line 13 can directly feed pressurized air to the auxiliary burner 8 from the air compressor 3 through the feed lines 20, 13 and 24 to enable the gas turbine 5 to be operated despite the malfunction.

Next, for a combined power generation system including a fuel cell 1 having an output of 5,000 kW and a gas turbine 5 in combination, an explanation will be provided of the method of operating such a combined power generation system according to the present invention, and data calculated for trial based on its heat account are described referring to specific numerical values.

First, as comparative example in which the auxiliary burner 8 in FIG. 1 is absent, as described hereinbefore relative to the prior art, 852 Nm$^3$/h of city gas is fed to the reformer 2 and in this state the fuel cell 1 generates 5,000 kW of electric power. In this operating condition, the compressor 3 compresses 14,000 Nm$^3$/h of air to 6.5 Kg/cm$^2$G and feeds the pressurized air to the cathode 1A of the fuel cell 1. The electric motor 4 consumes 1,280 kW of power for driving the compressor 3. The gas turbine 5 operates using as a working fluid or gas 19,000 Nm$^3$/h of ran exhaust combustion gas at 290° C. received from the reformer 2. As a result, the generator 6 generates 1,190 kW of electric power.

In contrast thereto, in the embodiment shown in FIG. 1, the addition of an additional fuel (e.g., city gas) in an amount of 378 Nm$^3$/h which is in balance against the amount of the off gas to be fed to the auxiliary burner 8 for combustion allows the inlet temperature of the gas turbine 5 to rise to 800° C. The inlet temperature elevation results in an increase of the output power of the gas turbine 5 to 2,490 kW. In other words, 378 Nm$^3$ of the additional fuel which is fed to the auxiliary burner 8 gives rise to 1,300 kW of additional power. The thermal efficiency of the additional fuel reaches 27% (HHV standard). On the other hand, in an ordinary open gas turbine installation which is not combined with a fuel cell, the thermal efficiency of the gas turbine is around 20% (HHV standard) when the inlet gas temperature is set to 800° C., which indicates that the combined power generation system of the embodiment shown in FIG. 1 can give a thermal efficiency at its sending end which is much higher than that of the ordinary open type gas turbine alone. This is because all the air necessary for the combustion of the additional fuel for the auxiliary burner 8 is furnished with the off gas from the fuel cell 1, which makes unnecessary the consumption of power for compressing air anew.

Therefore, the addition of the auxiliary burner 8 to the conventional fuel cell power generation plant and modification of the gas turbine 5 so that it can be adapted to an inlet gas temperature of 800° C. enable generation of a large amount of additional electric power by the generator 6 which amounts to about 30% of the output power generated by the fuel cell 1.

Embodiment 2

Figure 2:
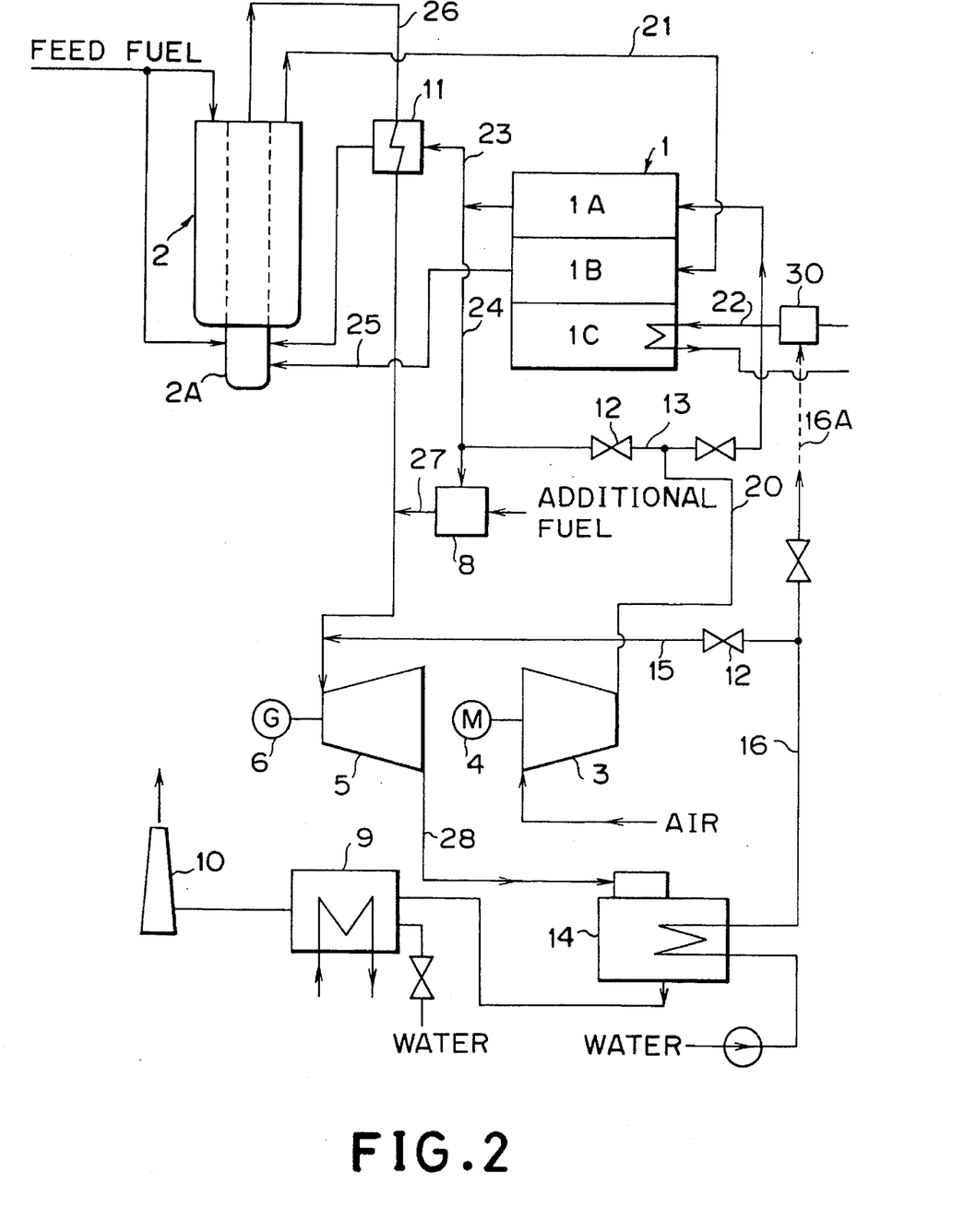
FIG. 2 is a schematic diagram showing the construction of a combined fuel cell/gas turbine power generation system according to a second embodiment of the present invention.

FIG. 2 is a schematic diagram showing the construction of a combined fuel cell/gas turbine power generation system according to a second embodiment of the present invention. This embodiment is an application example in which a chain cycle is applied to the gas turbine described in the embodiment 1. In addition to the constitutional elements shown in FIG. 1, there are an exhaust gas boiler 14 newly provided on the outlet side of the gas turbine 5, and steam lines 15 and 16 between the exhaust gas boiler 14 and the inlet side of the gas turbine 5, and between the exhaust gas boiler 14 and the cooling system (inclusive of the cooling plate 1C and the feed line 22) of the fuel cell 1, respectively.

In this construction, the introduction of a high temperature exhaust gas leaving the gas turbine 5 into the exhaust gas boiler 14 through a feed line 28 results in the generation of a large amount of steam in the boiler 14. Here, at the time of starting the operation of the fuel cell 1, the steam produced in the exhaust gas boiler 14 is fed through the steam lines 16 and 16A and introduced via a mixer 30, which is inserted in the feed line 22 and is connected to the steam line 16A, into the feed line 22, which extends into the cooling plate 1C of the fuel cell 1, so as to mix with the cooling water to thereby heat the cooling water so that the temperature of the body of the fuel cell 1 is elevated to near the operating temperature of the fuel cell. This temperature elevation avoids the necessity of a special purpose boiler for starting the operation of the fuel cell. On the other hand, during the operation of the fuel cell 1, the steam produced in the exhaust gas boiler 14 is introduced into the inlet side of the gas turbine 5 through the steam line 15 and the energy entrained by the steam is recovered as motive power from the turbine which works using the steam as a working fluid. This increases the power generated by the gas turbine 5.

Here, assuming the inlet gas temperature of the gas turbine 5 is 800° C. as described in embodiment 1 above, the outlet gas temperature of the turbine is maintained at a high level of about 500° C. Hence, the introduction of the exhaust gas into the exhaust gas boiler 14 enables the exhaust gas boiler 14 to produce steam at a pressure of about 10 Kg/cm$^2$ at a rate of 4.5 t/h. When the steam thus generated is introduced into the inlet side of the gas turbine 5 through the steam line 15, the power generated by the gas turbine 5 further increases, with the power generated by the generator 6 increasing by about 630 kW. Accordingly, the additional fuel (378 Nm$^3$/h) fed to the auxiliary burner 8 gives an additional electric power of 1,930 kW (in contrast to 1,300 kW attained in Embodiment 1). From this it follows that the thermal efficiency of the additional fuel increases to about 40%. In this embodiment, it is sufficient to merely replace, by an exhaust gas boiler, the boiler for starting the operation of the fuel cell in a conventional fuel cell power generation plant. There is no need for arrange further additional devices.

In the same manner as in Embodiment 2, the high temperature exhaust gas from the gas turbine 5 is introduced to the exhaust gas boiler 14 through the feed line 28 to produce a large amount of steam in the boiler 14. Here, at the time of starting the operation of the fuel cell 1, the steam produced in the exhaust gas boiler 14 is fed through the steam lines 16 and 16A and introduced via a mixer 30, which intervenes in the feed line 22 and is connected to the steam line 16, into the feed line 22 which extends into the cooling plate 1C of the fuel cell 1 so as to mix with the cooling water to thereby heat the cooling water so that the temperature of the body of the fuel cell 1 can be elevated to near the operating temperature of the fuel cell. This temperature elevation avoids the necessity of a special purpose boiler for starting the operation of the fuel cell.

Figure 3:
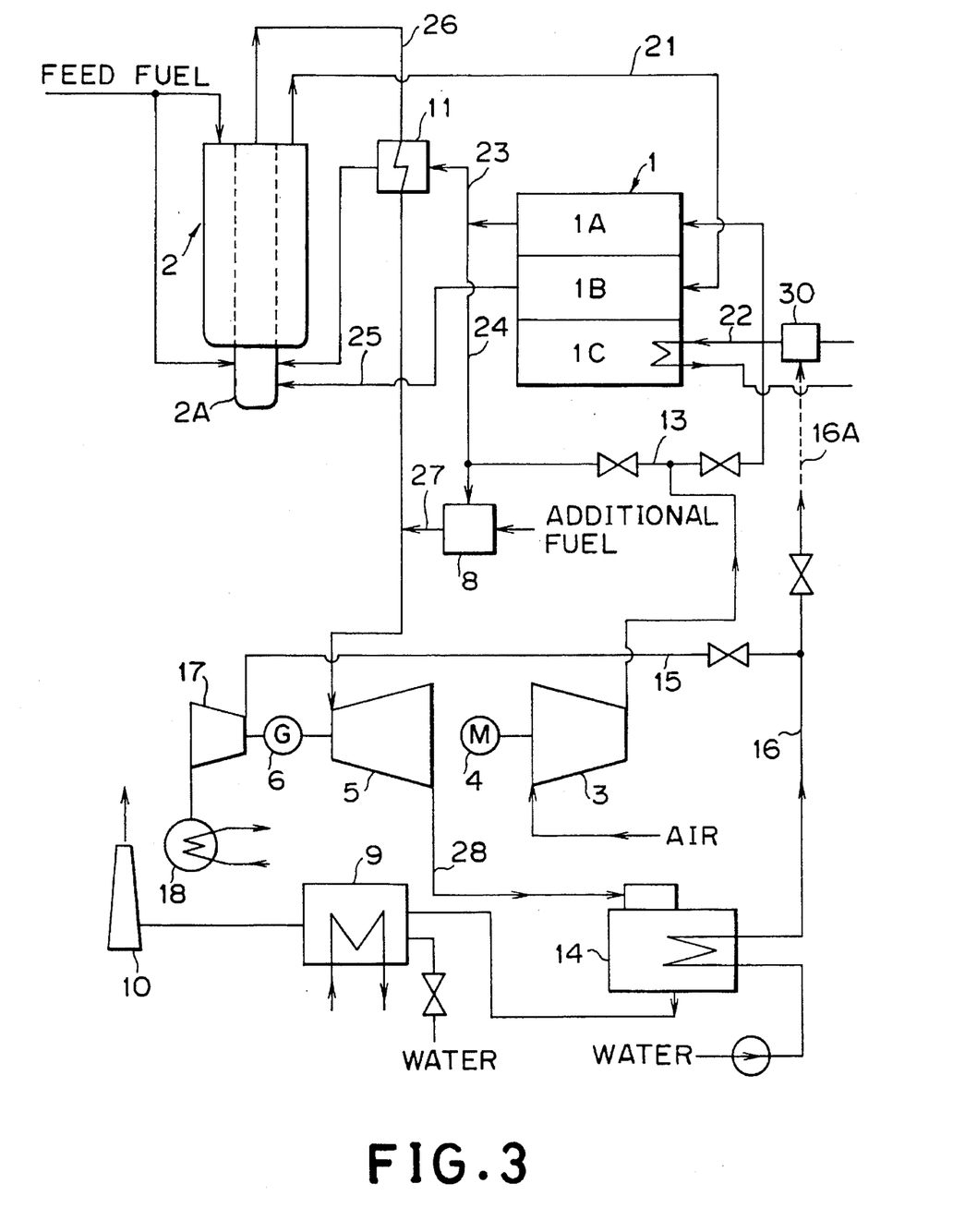
FIG. 3 is a schematic diagram showing the construction of a combined fuel cell/gas turbine power generation system according to a third embodiment of the present invention.

When the operation of the fuel cell is performed with the above-described construction, the axial output of the steam turbine 17 is added to the axial output of the gas turbine 5, and hence the increment of the power generated by the generator 6 amounts to 880 kW (the increment of the power in Embodiment 2 is 630 kW). Therefore, the additional fuel (378 Nm$^3$/h) gives rise to an additional electric power of 2,180 kW. As a result, the thermal efficiency of the additional fuel is elevated to 45%. In this case, the total thermal efficiency of the whole system is calculated to be 42.3%. Thus, there can be obtained a relatively high thermal efficiency (41.1%), which is higher than the thermal efficiency of the power plant using a high pressure phosphoric acid fuel cell alone.

Table 1 below summarizes data obtained in Embodiments 1, 2 and 3 above.

TABLE 1

|  | Gas Turbine Alone (800° C.) | Fuel Cell Alone | Embodiment 1 | Embodiment 2 | Embodiment 3 |
| --- | --- | --- | --- | --- | --- |
| Flow rate of fuel (Nm$^3$/h) | 378 | 852 | 1,230 | 1,230 | 1,230 |
| Output of fuel cell AC (KW) | — | 5,000 | 5,000 | 5,000 | 5,000 |
| Additional output AC (KW) | — | — | 1,300 | 1,930 | 2,180 |
| Output at sending end (KW) | 966 | 4,480 | 5,980 | 6,410 | 6,660 |
| Thermal efficiency of additional fuel % (HHV) | — | — | 27 | 40 | 45 |
| Total thermal efficiency % | 20 | 41.1 | 36.7 | 40.7 | 42.3 |
| Equilibrium temperature of reformer (°C.) | — | 783 | 783 | 783 | 783 |

Embodiment 3

FIG. 3 is a schematic diagram showing the construction of a combined fuel cell/gas turbine power generation system according to a third embodiment of the present invention. In contrast to Embodiment 2 above in which the steam produced in the exhaust gas boiler 14 is introduced to the inlet side of the gas turbine 5 to increase the power generated by the gas turbine 5, this embodiment additionally uses a condenser steam turbine 17 (exhaust pressure: 5 kPa) arranged coaxially with the gas turbine so that the steam produced by the exhaust gas boiler 14 can be fed to the steam turbine 17 through the steam line 15 to thereby recover power reference numeral 18 denotes a condenser of the steam turbine.

Embodiment 4

Figure 4:
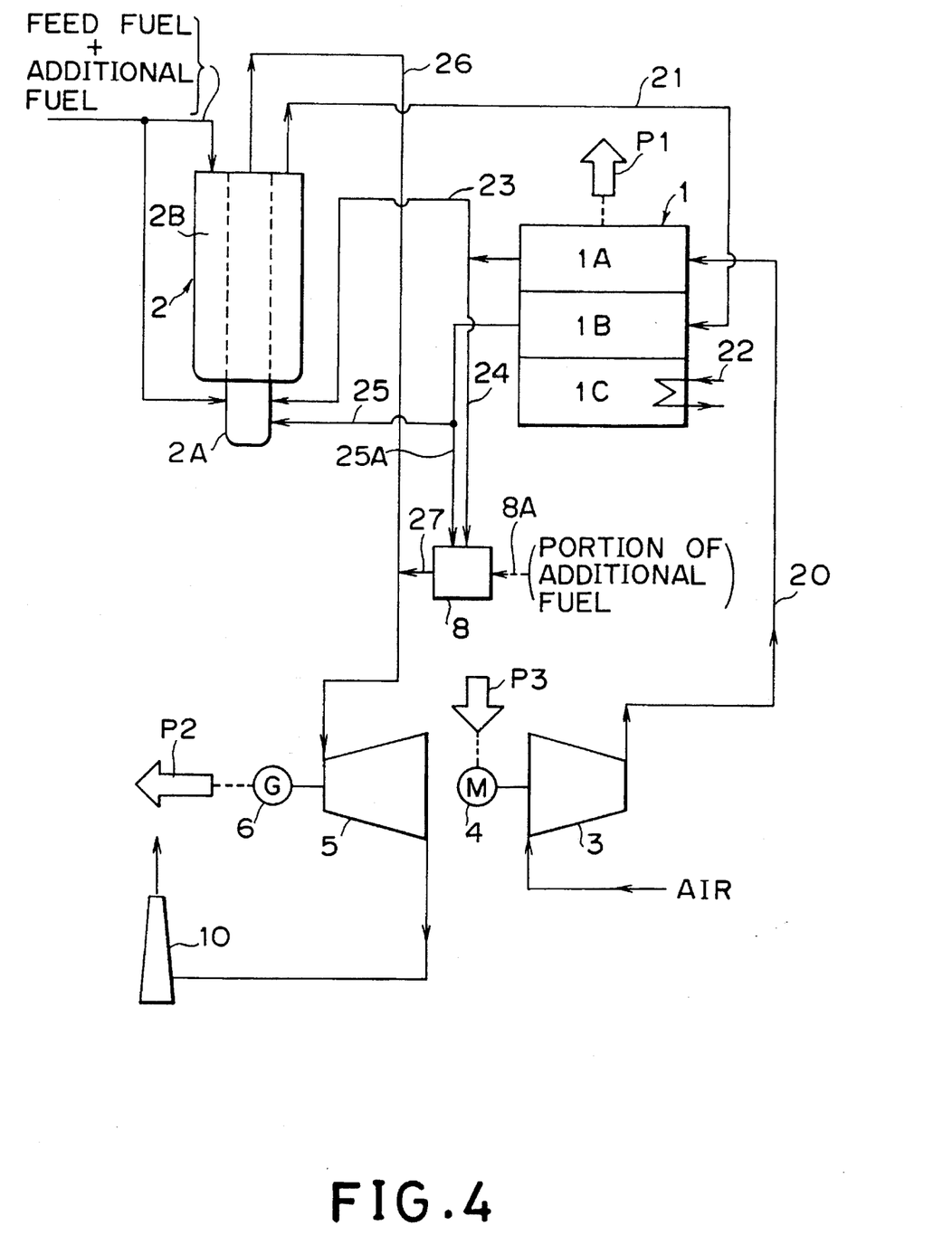
FIG. 4 is a schematic diagram showing the construction of a combined fuel cell/gas turbine power generation system according to a fourth embodiment of the present invention.

FIG. 4 is a schematic diagram showing the construction of a combined fuel cell/gas turbine power generation system according to a fourth embodiment of the present invention. In FIG. 4, reference numeral 1 denotes a pressure phosphoric acid fuel cell, 1A is a cathode of the fuel cell 1, 1B is an anode of the fuel cell 1, 1C is a cooling plate of the fuel cell 1, 2 is a reformer, 2A is a burner of the reformer 2, 3 is an air compressor which feeds pressurized air to the cathode 1A of the fuel cell 1, 4 is an electric motor for driving the air compressor 3, 5 is a gas turbine connected to an exhaust combustion gas line of the reformer 2, 6 is a generator coaxially connected to the gas turbine 5, 8 is an auxiliary burner arranged additionally according to the present invention, 10 is a chimney for releasing exhaust gas. Reference numerals 21, 22, 23, 24, 25, 25A, 26, and 27 are feed lines.

In the aforementioned construction, the air compressor 3 is driven by the electric motor 4 so that air taken from the open air and pressurized by the air compressor 3 is fed to the cathode 1A of the fuel cell 1 through the feed line 20. Feed gas (city gas) together with water for use in steam reforming is fed to the reformer 2 and reformed into a hydrogen-rich reformed fuel gas in the reformer 2 before it can be fed to the anode 1B of the fuel cell through the feed line 21. The fuel cell 1 receives these reactant gases (reformed fuel gas and pressurized air) and generates electricity therewith. During the operation of the fuel cell 1, cooling water is circulated through the feed line 22 extended into the cooling plate 1C to cool the body of the fuel cell 1. The off air from the cathode 1A during the operation of the fuel cell 1 is separately fed on one hand to the burner 2A of the reformer 2 through the feed line 23 and on the other hand to the auxiliary burner 8 through the feed line 24. In the burner 2A, the off air from the cathode 1A together with the off gas from the anode 1B fed through the feed line 25 are burned to give heat required for the reforming of the fuel. A portion of the off gas from the anode 1B is fed through the feed line 25A to the auxiliary burner 8. The combustion gas from the auxiliary burner 8 fed through the feed line 27 and combined with the exhaust combustion gas from the reformer 2 fed through the feed line 26, and the gas mixture introduced into the gas turbine 5. The gas turbine 5 generates electric power using the mixture of the exhaust combustion gas fed from the reformer 2 through the feed line 26 and the combustion gas obtained from the auxiliary burner 8 and fed through the feed lines 27 and 26 as a working fluid, and drives the generator 6 by its axial output or power. The electric power P2 generated by the generator 6, together with the electric power P1 generated by the fuel cell 1, is sent to an electric power system (not shown). A portion (P3) of the electric power (P1+P2) is consumed by the electric motor 4 when it drives the air compressor 3.

Next, for a combined power generation system including a fuel cell 1 having an output of 5,000 kW and a gas turbine 5 in combination, explanation will be made of the method of operating such a combined power generation system according to the present invention, and data calculated for trial based on its heat account are described referring to specific numerical values.

Figure 5:
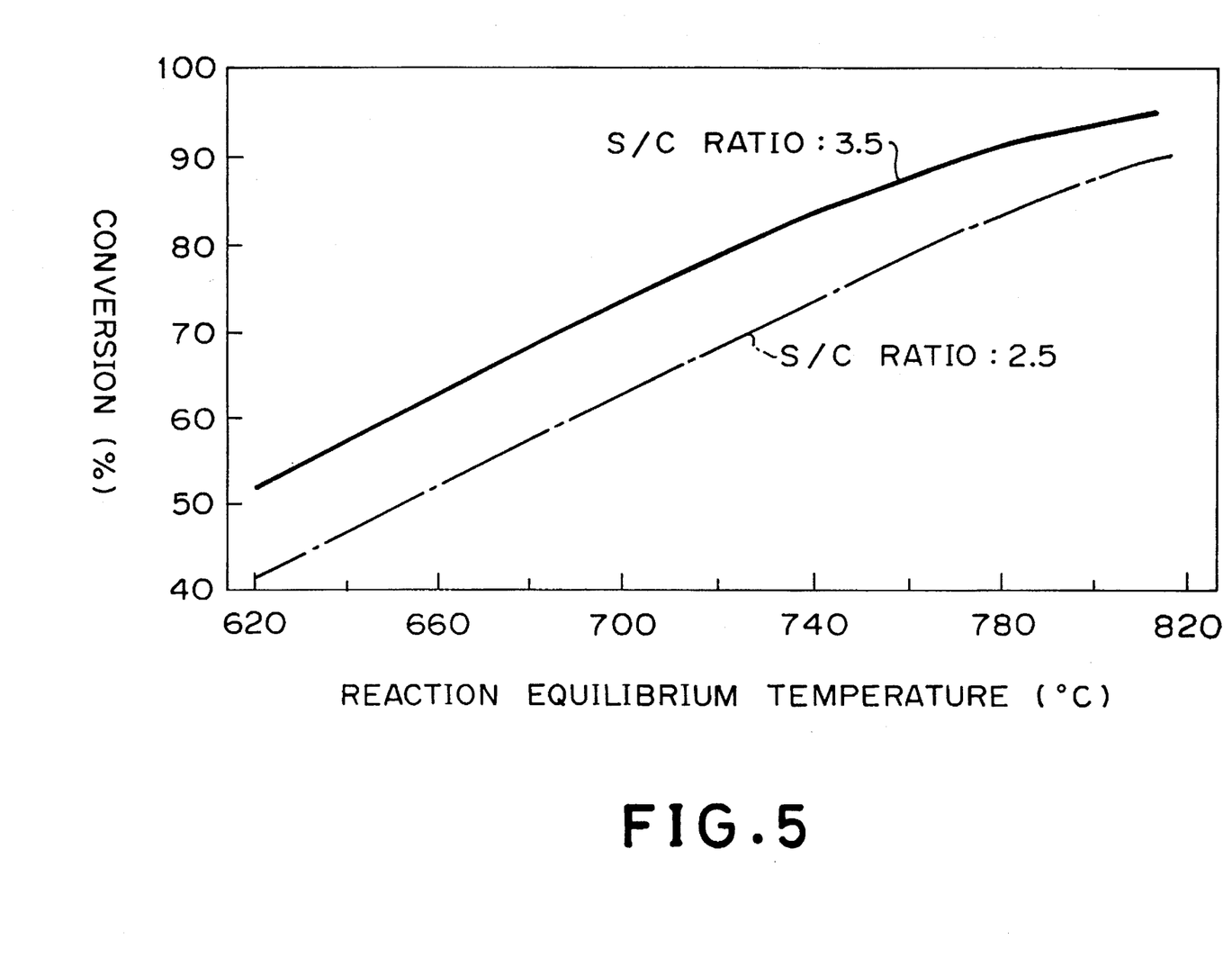
FIG. 5 is a graph illustrating the relationship between the reaction equilibrium temperature of a reformer and the conversion into hydrogen expressed in terms of steam ratio.

First, as a comparative example in which the auxiliary burner 8 in FIG. 1 is absent, as described hereinbefore relative to the prior art, 852 Nm$^3$/h of city gas is fed to the reformer 2 and in this state the fuel cell 1 generates 5,000 kW of electric power. In this operating condition, the compressor 3 compresses 14,000 Nm$^3$/h of air to a pressure of 6.5 Kg/cm$^2$G and feeds the pressurized air to the cathode 1A of the fuel cell 1. The electric motor 4 consumes 1,280 kW of power for driving the compressor 3. The gas turbine 5 operates using as a working fluid or gas 19,000 Nm$^3$/h of an exhaust combustion gas at 290° C. fed from the reformer 2. As a result, the generator 6 generates 1,190 kW of electric power. When the reformer 2 is operated under the conditions of a steam ratio of 3.5 and conversion into hydrogen of 93%, the equilibrium temperature of the reaction is 783° C. as will be understood from the characteristic diagram of the reformer 2 illustrated in FIG. 5, and in correspondence thereto the maximum temperature at which reforming pipes fitted in the reformer 2 are used is 970° C. from a viewpoint of the design of the reformer 2. In FIG. 5, S/C denotes numerical values which stand for steam ratios.

In contrast thereto, in the embodiment shown in FIG. 4, when the amount of the feed gas increases to 1,230 Nm$^3$/h (increase in the feed gas as compared with the comparative example: 378 Nm$^3$/h), which is the maximum feed amount within the range where all the feed gas can be burned with the off air from the fuel cell 1 assuming the oxygen utilization ratio of the fuel cell is 50%, and the steam to be added to the feed gas is in the same amount as the steam used in the comparative example, then the steam ratio decreases to 2.5. Here, in order to obtain hydrogen from the reformer 2 in an amount necessary for the operation of the fuel cell as in the comparative example, a conversion into hydrogen, in the reformer, of 64% is sufficient in contrast to the comparative example where this ratio is 93%. From this it follows that the equilibrium temperature of the reaction is 708° C. as can be seen from the characteristic diagram illustrated in FIG. 5, which is a graph illustrating the relationship between the reaction equilibrium temperature of the reformer and conversion into hydrogen expressed in terms of steam ratio. Stated differently, the addition of 378 Nm$^3$/h of feed gas results in a decrease in the equilibrium temperature of the reaction in the reformer 2 by 75° C. as compared with the comparative example.

This means that the maximum temperature at which the reforming pipes in the reformer 2 is employed can be lowered by at least 75° C. as compared with the comparative example. This alleviates the heat resistance conditions required on metal materials for use as the material for the reforming pipes. To be more specific using numerical values, the reforming pipes can be designed by setting their maximum service temperature to 895° C. This enables one to reduce the thickness of the metal material for the reforming pipes in the reformer to ⅔ of the thickness of the conventional reforming pipes. Accordingly, as the amount of the feed gas increases, the mass flow on a weight basis in the pipes increases. However, this causes no problem since the equilibrium temperature of the reaction in the reformer decreases and the rate of increase in the volume flowrate is at most about 10%, which can be well absorbed by allowances for the design of the pipes.

Figure 6:
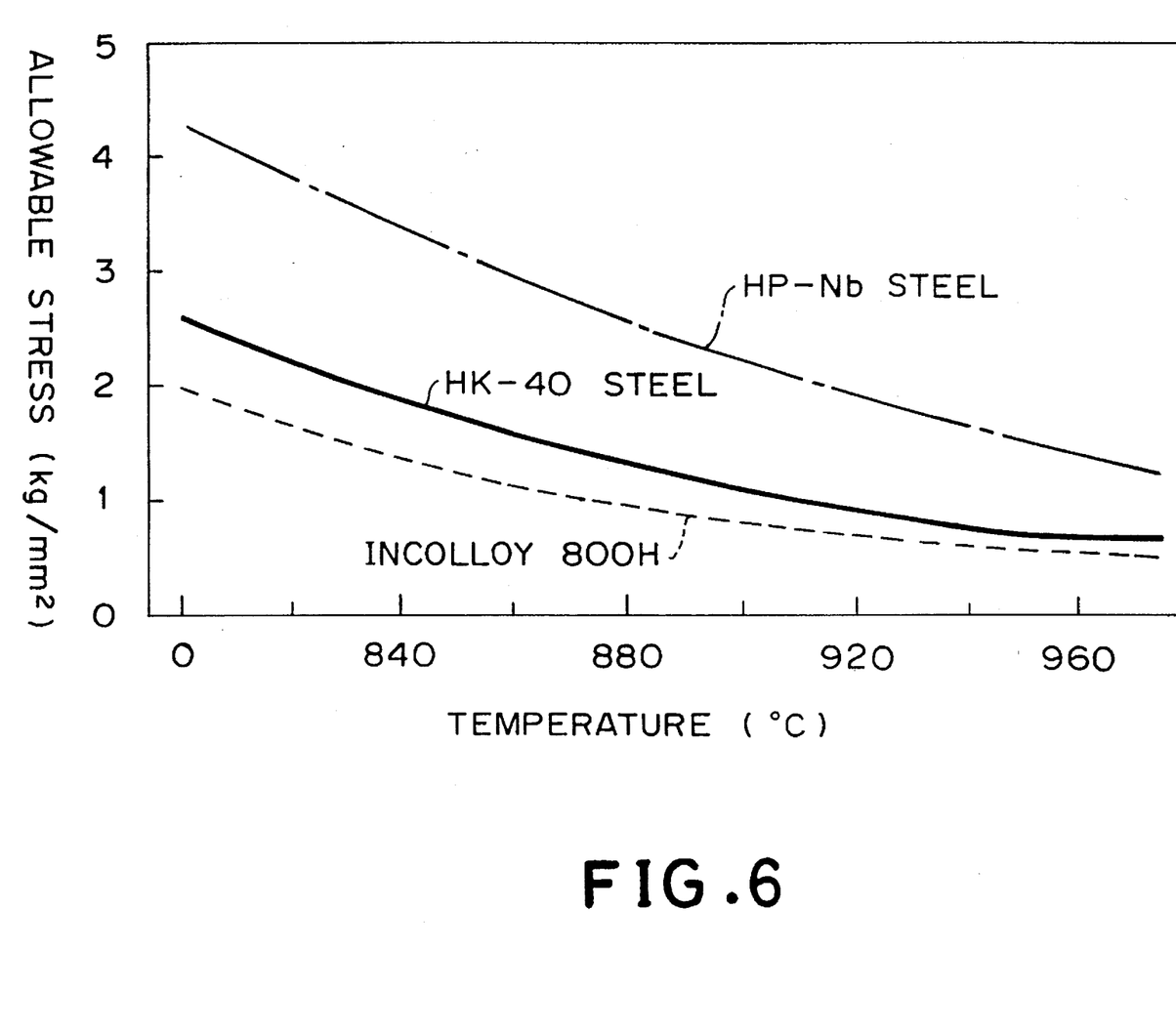
FIG. 6 is a graph illustrating the relationship between the temperatures at which various metal materials are used and allowable stresses.

FIG. 6, which is a graph illustrating the relationship between the temperatures at which various metal materials are used and their allowable stresses, illustrates the allowable stresses of Incolloy 800 H, HK-40 steel, and HP-Nb steel which are representative metal materials applicable to reforming pipes from the technical standards for heat power plants prescribed by the Japanese Ministry of International Trade and Industry and from catalogues published by the manufacturers of metal materials. From FIG. 6, it can be seen that when the maximum service temperature of the reformer is decreased from 970° to 895° C., the allowable stresses increase by about 60 to 70%.

On the other hand, when the feed gas to be supplied to the reformer 2 increases as described above, conversion into hydrogen decreases. As a result the reformed gas from the reformer 2 contains a large amount oil methane as an unreformed component. Then, as in the embodiment illustrated in FIG. 4, a portion of the off gas from the fuel cell 1 is fed to the auxiliary burner 8 through the feed line 24, and the remainder is introduced through the feed line 23 into the burner 2A of the reformer 2 for combustion. This prevents overheating of the fuel cell 1 but gives a sufficient amount of heat necessary for the steam reforming while the exhaust combustion gas from the reformer 2 is combined with the combustion gas of the auxiliary burner 8 to thereby increase the temperature of the working gas to be introduced into the gas turbine 5. As a result, the inlet gas temperature of the gas turbine 5 increases to 800° C. (in contrast to 290° C. in the aforementioned comparative example), in accordance with which the output power of the gas turbine increases, so that the power generated by the generator 6 increases to 2,490 kW. That is, the increment or newly added 378 Nm³/h of feed gas gives rise to an additional electric power of 1,300 kW, and the thermal efficiency of the addition or increment amounts to 27% (HHV standard).

In the case of an ordinary open type gas turbine alone, the thermal efficiency of the turbine at an inlet gas temperature of 800° C. is around 20% (expressed as HHV standard), and it can be seen that the application of the operating method of the present invention to a combined fuel cell/gas turbine power generation system gives a much higher sending end thermal efficiency as compared with the use of the gas turbine alone. This is because air necessary for the combustion of the additional fuel fed to the auxiliary burner is served completely by the exhaust air from the fuel cell 1, and hence consumption of energy for air compression becomes unnecessary.

Therefore, according to the present invention, it is sufficient to merely add an auxiliary burner to a conventional fuel cell power generation plant and replace the gas turbine by one having a specification suited for an inlet gas temperature of 800° C. in order to obtain, from the gas generator 6, a large amount of additional power which amounts to about 30% of the power generated by the fuel cell 1.

As indicated by a broken line 8A in FIG. 4, a portion of the additional fuel gas may be added to the auxiliary burner 8, and the remainder is supercharged to the reformer. In this case, the equilibrium temperature of the reaction is somewhere between the equilibrium temperature of the reaction when all of the additional fuel together with the feed gas is fed to the reformer 2 and the equilibrium temperature of the reaction when all of the additional fuel is fed to the auxiliary burner 8. Obviously, the equilibrium temperature of the reaction depends on the proportion of the portion of the additional fuel which is fed to the reformer.

Embodiment 5

Figure 7:
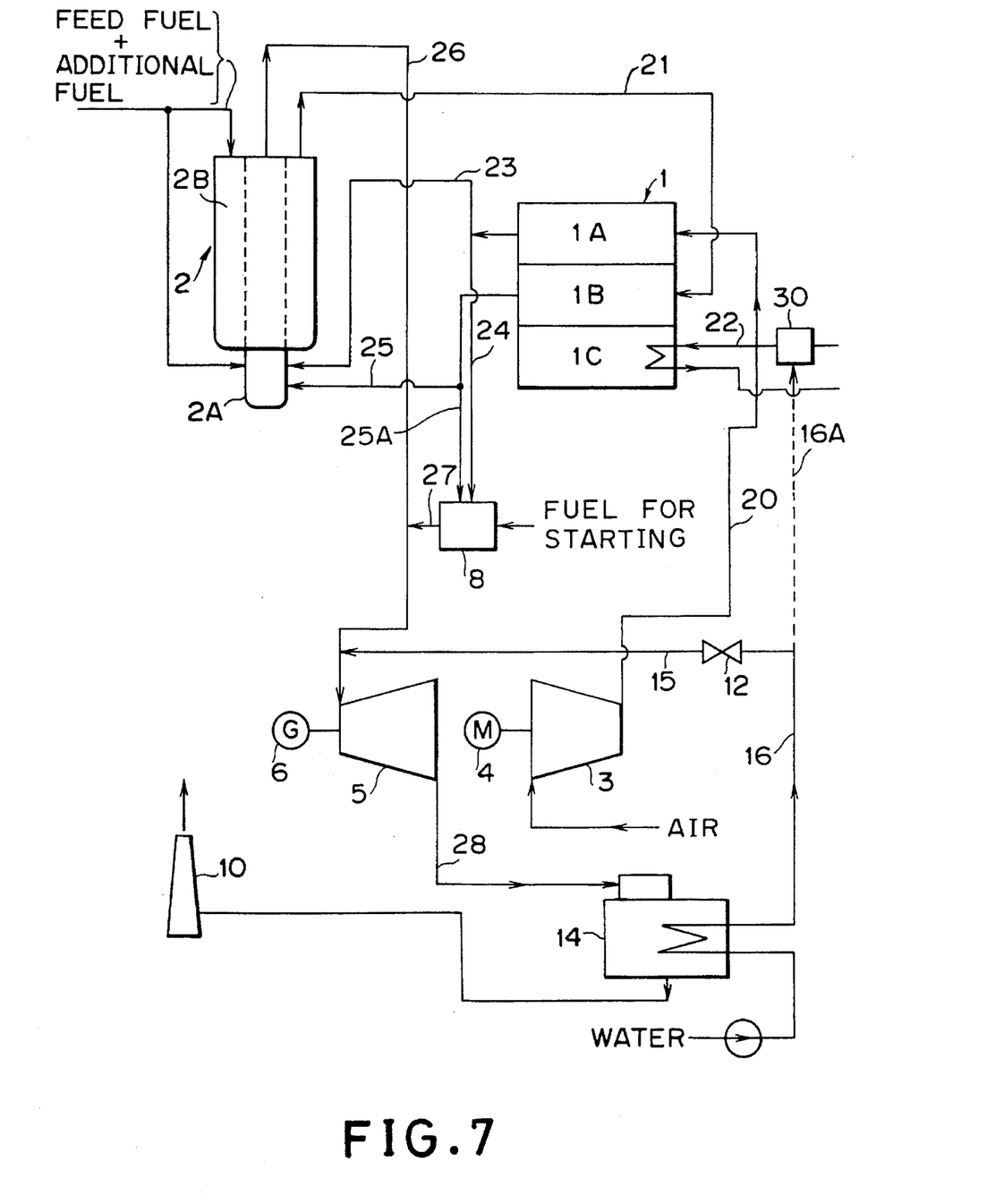
FIG. 7 is a schematic diagram showing the construction of a combined fuel cell/gas turbine power generation system according to a fifth embodiment of the present invention.

FIG. 7 is a schematic diagram showing the construction of a combined fuel cell/gas turbine power generation system according to a fifth embodiment of the present invention. This embodiment is an application example in which a chain cycle is applied to the gas turbine described in embodiment 4. In addition to the constitutional elements shown in FIG. 4, there are an exhaust gas boiler 14 newly provided as intervening on the outlet side of the gas turbine 5, and steam lines 15 and 16 between the exhaust gas boiler 14 and the inlet side of the gas turbine 5, and between the exhaust gas boiler 14 and the cooling system (cooling plate 1C and the feed line 22) of the fuel cell 1, respectively.

In this construction, assuming the inlet gas temperature of the gas turbine 5 is 800° C. and the outlet gas temperature of the gas turbine 5 is kept at 500° C. as described in Embodiment 4 above, the introduction of a high temperature exhaust gas from the gas turbine 5 into the exhaust gas boiler 14 generates in the boiler 14 steam at a pressure of about 10 kg/cm² at a rate of 4.5/h. When the steam is introduced into the inlet of the gas turbine 5 through the steam line 15, the power generated by the gas turbine 5 increases further while the power generated by the generator 6 increases by about 630 kW. From this, it follows that with the increment (378 Nm³/h) in the amount of the feed gas fed to the reformer 2, the generator 6 generates an additional power of 1,930 kW (in contrast to Embodiment 1 in which additional power is 1,300 kW). Thus the thermal efficiency of the additional fuel increases to about 40%.

Further, as indicated by a broken line 16A in FIG. 7, the steam line 16 from the exhaust gas boiler 14 may be connected through an extended portion 16A of the feed line 16 to a mixer 30 which is connected to the feed line 16A and provided as intervening the feed line 22 through which there is circulated cooling water for cooling the cooling plate 1C so that the steam from the boiler 14 can be mixed with the cooling water. When a fuel for starting (city gas) is charged in the auxiliary burner 8 and burned therein at the time of starting the operation of the fuel cell 1, the temperature of the body of the fuel cell 1 increases to a temperature near the operating temperature of the fuel cell. In other words, the exhaust gas boiler 14 can be used also as a boiler for starting the operation of the fuel cell.

Similarly to Embodiment 4 shown in FIG. 4, a portion of the additional fuel gas may be added to the auxiliary burner 8 (cf., the broken line 8A in FIG. 4), and the remainder is supercharged to the reformer. In this case, the equilibrium temperature of the reaction is somewhere between the equilibrium temperature of the reaction when all of the additional fuel together with the feed gas is fed to the reformer 2 and the equilibrium temperature of the reaction when all of the additional fuel is fed to the auxiliary burner 8. Obviously, the equilibrium temperature of the reaction depends on the proportion of the portion of the additional fuel which is fed to the reformer.

Embodiment 6

Figure 8:
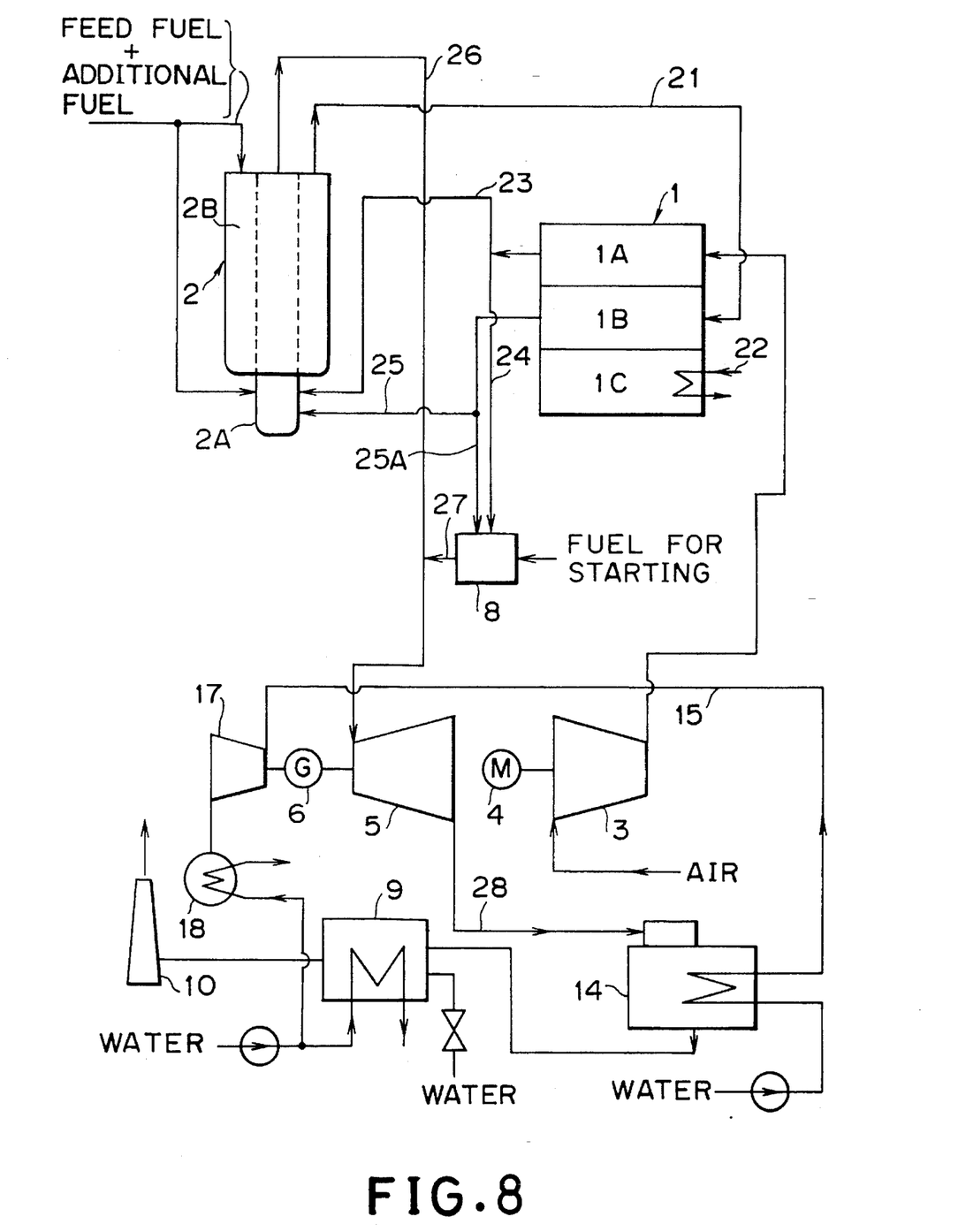
FIG. 8 is a schematic diagram showing the construction of a combined fuel cell/gas turbine power generation system according to a sixth embodiment of the present invention.

FIG. 8 is a schematic diagram showing the construction of a combined fuel cell/gas turbine power generation system according to a sixth embodiment of the present invention in which a combined cycle of a gas turbine and a steam turbine is applied to a combined power generation system. More specifically, in contrast to Embodiment 7 above in which the steam produced in the exhaust gas boiler 14 is fed to the inlet side of the gas turbine 5 to increase the power generated by the gas turbine 5, this embodiment additionally uses a condenser steam turbine 17 (exhaust pressure: 5 kPa) arranged coaxially with the gas turbine 5 so that the steam produced by the exhaust gas boiler 14 can be fed to the steam turbine 17 through the steam line 15 to thereby recover power. Reference numeral 18 is a condenser of the steam turbine.

When the fuel cell/gas turbine combined system having this construction is operated with feeding an increased amount of feed gas to the reformer 2 in the same manner as in the preceding embodiments, the axial power output of the steam turbine 17 is added to the axial power output of the gas turbine 5, and hence the increment of the power generated by the generator 6 amounts to 880 kW (in contrast to 630 kW in Embodiment 5). Therefore, the additional electric power obtained with the additional fuel (378 Nm³/h) is 2,180 kW, with the thermal efficiency of the additional fuel increasing up to 45%. In this case, tentative calculation indicates that the total thermal efficiency of the whole system amounts to 42.3% which is superior to the thermal efficiency (41.1%) of a power generation plant using the pressure phosphoric acid fuel cell alone.

Recently, there have been put into practice gas turbines whose inlet gas temperature is on the order of 1,200° C. Such gas turbines can be applied to the combined power generation systems in the aforementioned embodiments by operating the fuel cell 1 at an oxygen utilization ratio lower than 50% and further increasing the amount of the additional feed gas to cope with the increase in the inlet gas temperature of the gas turbine.

Similarly tie Embodiment 4 above, a portion of the additional fuel gas may be added to the auxiliary burner 8, and the remainder is supercharged to the reformer. In this case, the equilibrium temperature of the reaction is somewhere between the equilibrium temperature of the reaction when all of the additional fuel together with the feed gas is fed to the reformer 2 and the equilibrium temperature of the reaction when all of the additional fuel is fed to the auxiliary burner 8. Obviously, the equilibrium temperature of the reaction depends on the proportion of the portion of the additional fuel which is fed to the reformer.

Table 2 below summarizes data obtained in Embodiments 4, 5 and 6 above.

TABLE 2

|  | Gas Turbine Alone (800° C.) | Fuel Cell Alone | Embodiment 1 | Embodiment 2 | Embodiment 3 |
|---|---|---|---|---|---|
| Flow rate of fuel (Nm³/h) | 378 | 852 | 1,230 | 1,230 | 1,230 |
| Output of fuel cell AC (KW) | — | 5,000 | 5,000 | 5,000 | 5,000 |
| Additional output AC (KW) | — | — | 1,300 | 1,930 | 2,180 |
| Output at sending end (KW) | 966 | 4,480 | 5,780 | 6,410 | 6,660 |
| Thermal efficiency of additional fuel % (HHV) | — | — | 27 | 40 | 45 |
| Total thermal efficiency % | 20 | 41.1 | 36.7 | 40.7 | 42.3 |
| Equilibrium temperature of reformer (°C.) | — | 783 | 708 | 708 | 708 |

As described above, the combined power generation system of the present invention has various advantages which follow. (1) In a combined fuel cell/gas turbine power generation system including a pressure fuel cell and a gas turbine in combination, positively or purposely elevating of the temperature of the inlet of the gas turbine by supplying an additional amount of fuel corresponding to the amount of off air from the fuel cell to an auxiliary burner additionally arranged on the inlet side of the fuel cell allows the gas turbine to produce an additional power at a high thermal efficiency in addition to the power corresponding to the waste heat recovered from the fuel cell, the additional power being recovered as electric power from the generator arranged in the system. (2) By recovering waste heat from the gas turbine using an exhaust gas boiler, steam generated in the exhaust gas boiler can be utilized as a heat source for preheating the fuel cell when the operation of the fuel cell is to be started. Also, the steam generated in the exhaust gas boiler can be led to the inlet of the gas turbine to perform a chain cycle, or to an additionally arranged steam turbine to perform a combined cycle for operating the gas turbine and the steam turbine, so that the waste heat from the gas turbine can be recovered as power to increase the total thermal efficiency of the whole system.

The method of operating a combined fuel cell/gas turbine power generation system according to the present invention has the following advantages. (3) That is, the maximum temperature allowed to the reformer from the viewpoint of its design can be lowered by increasing the amount of feed gas to be fed to a reformer while maintaining the amount of hydrogen produced in the reformer at a level enough to operate the fuel cell, and keeping both the conversion of feed gas into hydrogen and the equilibrium temperature of reforming the reaction at low levels. This gives great advantages in designing reformers, selection of metal materials for reformers, and manufacture of reformers. (4) Since the quantity of heat corresponding to an additional fuel is utilized for increasing the temperature of the working gas to be fed to the gas turbine, a large amount of additional power can be obtained from the gas turbine at a high thermal efficiency. By recovering this additional power, the total thermal efficiency of the whole combined power generation system can be increased to a great extent.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A fuel cell/gas turbine combined power generation system comprising:

a high pressure fuel cell which generates power with a reformed fuel gas and pressurized air as reactant gases;

a reformer which feeds said reformed fuel gas to said fuel cell;

an air compressor which feeds said pressurized air to said fuel cell;

an auxiliary burner which burns additional fuel added thereto with off gas from said fuel cell to form a combustion gas;

a gas turbine which obtains power from a working fluid comprising said combustion gas from said auxiliary burner; and a generator driven by an axial output power of said gas turbine.

2. The combined power generation system as claimed in claim 1, further comprising means for feeding an exhaust combustion gas from said reformer to said gas turbine.

3. The combined power generation system as claimed in claim 2, further comprising an exhaust gas boiler which generates steam utilizing an exhaust gas from said gas turbine as a heat source.

4. The combined power generation system as claimed in claim 3, wherein the steam generated in said exhaust gas boiler is introduced into said fuel cell to preheat a body of said fuel cell when operation of said fuel cell is started.

5. The combined power generation system as claimed in claim 3, wherein the steam generated in said exhaust gas boiler is fed to said gas turbine to recover heat during operation of said fuel cell.

6. The combined power generation system as claimed in claim 3, wherein the steam generated in said exhaust gas boiler is fed to a steam turbine which is coaxially connected to said gas turbine to drive said generator.

7. The combined power generation system as claimed in claim 2, further comprising a bypass line which bypasses said fuel cell and feeds said pressurized air from said air compressor to said auxiliary burner.

8. The combined power generation system as claimed in claim 2, further comprising:
   an electric motor connected to said air compressor, said electric motor driving said air compressor, and
   an electric power line, said electric power line feeding power generated by said generator to said electric motor.

9. A combined fuel cell/gas turbine power generation system comprising:
   a reformer which reforms a feed gas to generate a reformed fuel gas;
   an air compressor which produces pressurized air;
   a high pressure fuel cell having an anode connected to said reformer and which receives reformed gas from said reformer, and a cathode connected to said air compressor and which receives pressurized air from said air compressor, said fuel cell using the reformed fuel gas and the pressurized air as reactant gases;
   an auxiliary burner connected to the cathode of said fuel cell, said auxiliary burner burning an additional fuel and an off gas from the cathode of said fuel cell to produce a combustion gas;
   a gas turbine connected to said auxiliary burner, said gas turbine generating power using as a working fluid said combustion gas from said auxiliary burner; and
   a generator coaxially connected to said gas turbine and driven by an axial output power of said gas turbine.

10. The combined power generation system as claimed in claim 9, further comprising:
    a bypass line connected to said air compressor and to said auxiliary burner, said bypass line bypassing said fuel cell to directly feed the pressurized air from said air compressor to said auxiliary burner.

11. The combined power generation system as claimed in claim 9, further comprising:
    an exhaust gas boiler connected to said gas turbine, said exhaust gas boiler producing steam using the exhaust gas from said gas turbine as a heat source.

12. The power generation system as claimed in claim 11, further comprising a first steam line connecting said exhaust gas boiler to said fuel cell, said first steam line feeding the steam produced in said exhaust gas boiler to said fuel cell to preheat a body of said fuel cell when operation of said fuel cell is started.

13. The combined power generation system as claimed in claim 12, wherein the body of said fuel cell is provided with a cooling means having a feed line for circulating cooling water.

14. The combined power generation system as claimed in claim 13, further comprising:
    a mixer inserted in the feed line of said cooling means, wherein said first steam line is connected to the feed line of said cooling means through said mixer.

15. The power generation system as claimed in claim 11, further comprising a second steam line connecting said exhaust gas boiler to said gas turbine, said second steam line feeding the steam produced in said exhaust gas boiler to said gas turbine for heat recovery.

16. The combined power generation system as claimed in claim 15, further comprising means provided between said anode and said auxiliary burner for feeding a portion of an off gas from said anode to said auxiliary burner.

17. The power generation system as claimed in claim 11, further comprising a steam turbine coaxially connected to said gas turbine, and
    a third steam line connecting said exhaust gas boiler to said steam turbine, said third steam line feeding the steam produced in said exhaust gas boiler to said steam turbine to drive said generator.

18. The combined power generation system as claimed in claim 17, further comprising means provided between said anode and said auxiliary burner for feeding a portion of an off gas from said anode to said auxiliary burner.

19. The combined power generation system as claimed in claim 9, further comprising:
    an electric motor connected to said air compressor, said electric motor driving said air compressor, and
    an electric power line, said electric power line feeding power generated by said generator to said electric motor.

20. The combined power generation system as claimed in claim 19, further comprising a means provided between said anode and said auxiliary burner for feeding a portion of an off gas from said anode to said auxiliary burner.

21. The combined power generation system as claimed in claim 9, further comprising means provided between said anode and said auxiliary burner for feeding a portion of an off gas from said anode to said auxiliary burner.

22. The combined power generation system as claimed in claim 12, further comprising means provided between said anode and said auxiliary burner for feeding a portion of an off gas from said anode to said auxiliary burner.

23. The combined power generation system as claimed in claim 9, further comprising means for feeding an exhaust combustion gas from said reformer to said gas turbine.

24. The combined power generation system as claimed in claim 23, further comprising:
    an exhaust gas boiler connected to said gas turbine, said exhaust gas boiler producing steam using the exhaust gas from said gas turbine as a heat source.

25. The combined power generation system as claimed in claim 24, further comprising:
    a steam turbine coaxially connected to said gas turbine; and
    a third steam line connecting said exhaust gas boiler to said steam turbine, said third steam line feeding the steam produced in said exhaust gas boiler to said steam turbine to drive said generator.

26. The combined power generation system as claimed in claim 25, wherein the body of said fuel cell is provided with a cooling means having a feed line for circulating cooling water.

27. The combined power generation system as claimed in claim 26, further comprising:
    a mixer inserted in the feed line of said cooling means.

28. The combined power generation system as claimed in claim 23, further comprising:

a bypass line connected to said air compressor and to said auxiliary burner, said bypass line bypassing said fuel cell to directly feed the pressurized air from said air compressor to said auxiliary burner.

29. The combined power generation system as claimed in claim 24, further comprising:

a first steam line connecting said exhaust gas boiler to said fuel cell, said first steam line feeding the steam produced in said exhaust gas boiler to said fuel cell to preheat a body of said fuel cell when operation of said fuel cell is started.

30. The combined power generation system as claimed in claim 24, further comprising:

a second steam line connecting said exhaust gas boiler to said gas turbine, said second steam line feeding the steam produced in said exhaust gas boiler to said gas turbine for heat recovery.

31. A method of operating a combined fuel cell/gas turbine power generation system including a fuel cell which generates power using as reactant gases a hydrogen rich reformed gas obtained by steam reforming of a feed gas in a reformer, and a pressurized air obtained by compressing air taken from open air by a compressor, a gas turbine which recovers power utilizing as a working fluid a combustion gas from said reformer obtained by burning an off gas and an off air from said fuel cell, and a generator which is coaxially connected to said gas turbine and driven by an axial output power of said gas turbine, said generator generating power with an axial output power of said generator, the output power of said generator driving said electric motor in said air compressor, said fuel cell, said gas turbine and said generator being in operational combination, wherein said method comprises the steps of:

increasing an amount of a feed gas to be fed to said reformer, without substantially changing an amount of hydrogen produced, to maintain a conversion into hydrogen and an equilibrium temperature of reaction at low levels, respectively;

converting heat generated with an unreformed portion of said feed fuel into power by said gas turbine, said unreformed portion of said feed fuel being in an amount which corresponds to said additional amount of said feed gas; and recovering said power as electric power from said generator.

32. The method as claimed in claim 31, further comprising the steps of:

feeding a portion of said off gas and a portion of said off air to an auxiliary burner connected to said fuel cell and said gas turbine;

burning said portion of said off gas and said portion of said off air in said auxiliary burner to produce a combustion gas; and feeding said combustion gas together with said exhaust combustion gas from said reformer to said gas turbine.

33. A method of operating a combined fuel cell/gas turbine power generation system including a fuel cell which generates power using as reactant gases a hydrogen rich reformed gas obtained by steam reforming of a feed gas in a reformer, and a pressurized air obtained by compressing air taken from open air by a compressor, a gas turbine which recovers power utilizing as a working fluid a combustion gas from said reformer obtained by burning an off gas and an off air from said fuel cell, and a generator which is coaxially connected to said gas turbine and driven by an axial output power of said gas turbine, wherein said method comprises the steps of:

providing an auxiliary burner which is connected to said fuel cell and said gas turbine, feeding a portion of said off gas and a portion of said off air to said auxiliary burner;

feeding to said auxiliary burner an additional fuel in an amount in balance against an amount of said portion of said off gas from said fuel cell so that oxygen in said portion of said off gas can be consumed substantially completely;

burning said additional fuel and said portion of said off gas, and said portion of said off air in said auxiliary burner to produce a combustion gas; and feeding said combustion gas together with said exhaust combustion gas from said reformer to said gas turbine.

* * * * *